United States Patent
Leblang et al.

(10) Patent No.: US 11,682,382 B2
(45) Date of Patent: Jun. 20, 2023

(54) VOICE-ACTIVATED SELECTIVE MEMORY FOR VOICE-CAPTURING DEVICES

(71) Applicant: Amazon Technologies, Inc., Seattle, WA (US)

(72) Inventors: Jonathan Alan Leblang, Menlo Park, CA (US); Kevin Crews, Seattle, WA (US); Qi Zhou, Santa Clara, CA (US); Gary Zhong, Milpitas, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/062,376

(22) Filed: Oct. 2, 2020

(65) Prior Publication Data

US 2021/0020163 A1    Jan. 21, 2021

Related U.S. Application Data

(63) Continuation of application No. 15/697,345, filed on Sep. 6, 2017, now Pat. No. 10,796,687.

(51) Int. Cl.
*G06F 3/16* (2006.01)
*G10L 15/065* (2013.01)
(Continued)

(52) U.S. Cl.
CPC ............ *G10L 15/065* (2013.01); *G06F 3/167* (2013.01); *G06F 16/3344* (2019.01);
(Continued)

(58) Field of Classification Search
CPC ................................ G06F 3/167; H04M 1/642
See application file for complete search history.

(56) References Cited

U.S. PATENT DOCUMENTS

| 5,764,278 A | 6/1998 | Nagao |
| 7,548,862 B2 | 6/2009 | Kaneko et al. |

(Continued)

FOREIGN PATENT DOCUMENTS

| CN | 105009204 A | 10/2015 |
| EP | 0170272 | * 7/1985 |

(Continued)

OTHER PUBLICATIONS

Grant Clauser, "What is Alexa? What is the Amazon Echo, and Should You Get One?", Retrieved from URL: http://thewirecutter.com/reviews/what-is-alexa-what-is-the-amazon-echo-and-should-you-get-one/on Feb. 23, 2017, pp. 1-18.

(Continued)

*Primary Examiner* — Feng-Tzer Tzeng
(74) *Attorney, Agent, or Firm* — Robert C. Kowert; Kowert, Hood, Munyon, Rankin & Goetzel, P.C.

(57) ABSTRACT

Methods, systems, and computer-readable media for voice-activated selective memory for voice-capturing devices are disclosed. A first voice input from a voice-capturing device is received, via a network, at a service provider environment comprising one or more services. The first voice input comprises one or more utterances from a user of the voice-capturing device. A representation of the first voice input is stored. A second voice input from the voice-capturing device is received, via the network, at the service provider environment. The second voice input represents a command to disregard the first voice input. Based on the second voice input, the representation of the first voice input is deleted.

20 Claims, 9 Drawing Sheets

(51) Int. Cl.
*G10L 15/30* (2013.01)
*G06F 16/33* (2019.01)
*G10L 15/22* (2006.01)
*G10L 15/18* (2013.01)
*H04M 1/64* (2006.01)

(52) U.S. Cl.
CPC .............. *G10L 15/22* (2013.01); *G10L 15/30* (2013.01); *G10L 15/1822* (2013.01); *G10L 2015/223* (2013.01); *H04M 1/642* (2013.01)

(56) References Cited

U.S. PATENT DOCUMENTS

| | | |
|---|---|---|
| 8,041,573 B2 | 10/2011 | Da Palma et al. |
| 8,219,407 B1 | 7/2012 | Roy |
| 8,630,851 B1 | 1/2014 | Hertschuh |
| 9,390,079 B1 | 7/2016 | Reicher et al. |
| 9,691,378 B1 | 6/2017 | Meyers |
| 10,796,687 B2 | 10/2020 | Leblang et al. |
| 2001/0016815 A1* | 8/2001 | Takahashi ............... G10L 15/26 704/235 |
| 2006/0235699 A1 | 10/2006 | Dhanakshirur |
| 2014/0304606 A1 | 10/2014 | Ohmura et al. |
| 2015/0045003 A1 | 2/2015 | Vora |
| 2015/0254059 A1 | 9/2015 | Duan et al. |
| 2016/0042748 A1 | 2/2016 | Jain et al. |
| 2016/0100206 A1 | 4/2016 | Beckhardt et al. |
| 2016/0239258 A1* | 8/2016 | Lenchner ............... G06F 3/017 |
| 2016/0284207 A1 | 9/2016 | Hou et al. |
| 2017/0040018 A1 | 2/2017 | Tormey |
| 2017/0055126 A1 | 2/2017 | O'Keeffe |
| 2018/0308480 A1 | 10/2018 | Jang et al. |

FOREIGN PATENT DOCUMENTS

| | | |
|---|---|---|
| EP | 0170272 B1 * | 12/1991 |
| JP | 2009109585 A | 5/2009 |
| JP | 2012501481 | 1/2012 |
| JP | 2014202857 | 10/2014 |
| JP | 2015169768 | 9/2015 |
| WO | 2010025441 | 3/2010 |
| WO | 2015179510 | 11/2015 |
| WO | 2016003419 A1 | 1/2016 |

OTHER PUBLICATIONS

International Search Report and Written Opinion from PCT/US2018/049525, dated Nov. 30, 2018, Amazon Technologies, Inc., pp. 1-12.
Office Action from Japanese Application No. 2020-512574, dated Feb. 9, 2021, (English Translation and Japanese Version), pp. 1-15.
Office Action dated Jan. 4, 2023 in Chinese Patent Application No. 201880057850.1, Amazon Technologies, Inc., pp. 1-12 (including translation).
Ying Liu, Research and Construction of Large Vocabulary Continuous Speech Recognition System, Application for Masters Thesis, Tsinghua University, Department of Computer Science and Technology, May 2005, pp. I-VI, 1-86.
Po-Chuan Lin, Personal Speech Calendar with Timing Keywords Aware and Schedule Time Prediction Functions, In TENCON 2010-2010 IEEE Region 10 Conference, Nov. 21, 2010, pp. 746-750, IEEE.

* cited by examiner

__US 11,682,382 B2__

VOICE-ACTIVATED SELECTIVE MEMORY FOR VOICE-CAPTURING DEVICES

This application is a continuation of U.S. patent application Ser. No. 15/697,345, filed Sep. 6, 2017, which is hereby incorporated by reference herein its entirety.

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. As the scale and scope of distributed systems have increased, the tasks of provisioning, administering, and managing the resources have become increasingly complicated.

A distributed system may provide remote clients with access to various services that are implemented largely within the distributed system and that are accessible via a network such as the Internet. Such services may be said to reside "in the cloud." The types of devices that can access cloud-based services continue to expand and diversify, including, for example, desktop computing devices, mobile devices such as smartphones and tablets, voice-capturing devices, home automation devices, and various other types of network-capable devices that are part of the "Internet of Things (IoT)." By accessing cloud-based services, a diverse universe of devices may access additional functionality or computing power not available locally on the devices.

Figure 1A:
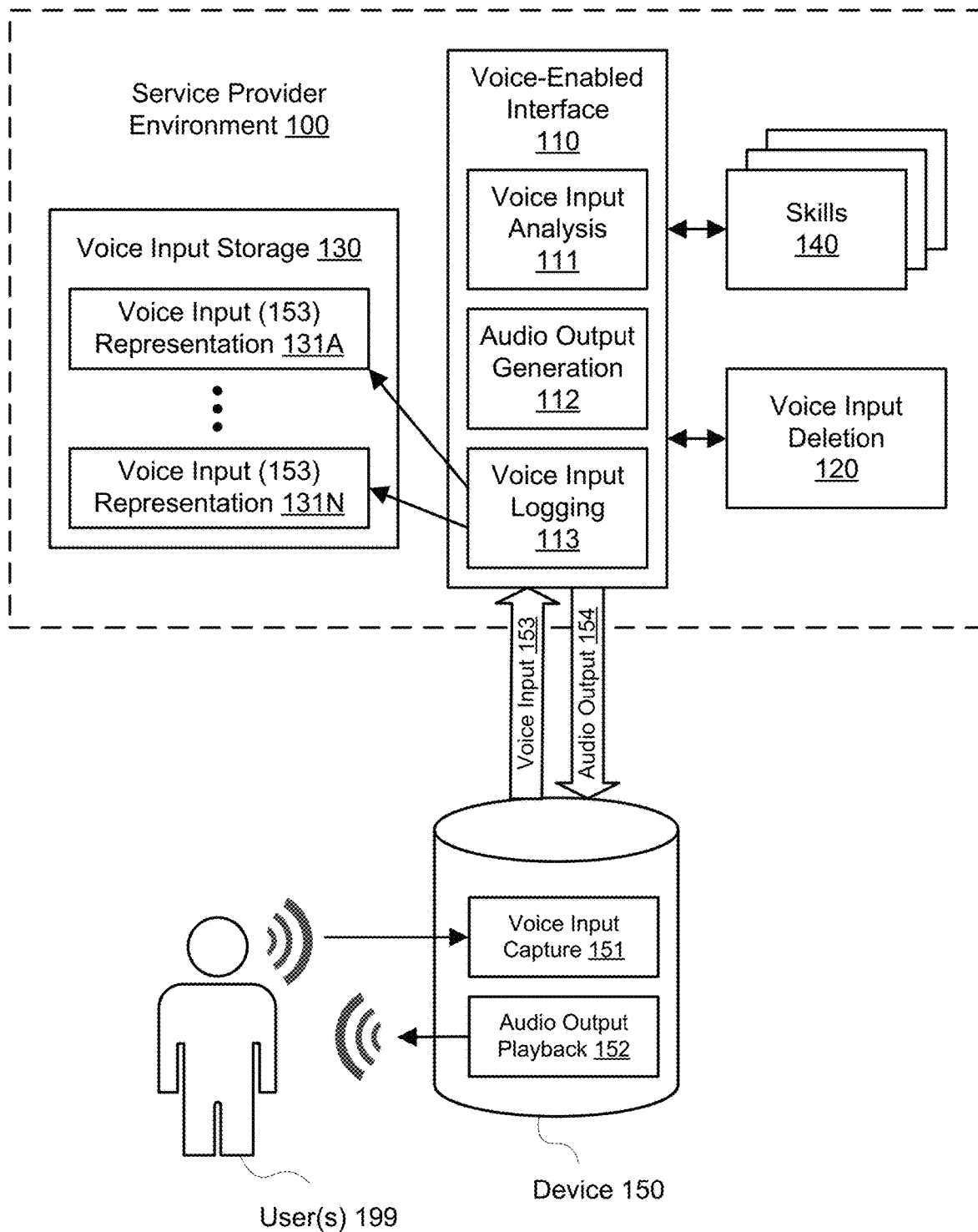
FIG. 1A and FIG. 1B illustrate an example system environment for voice-activated selective memory for voice-capturing devices, according to one embodiment.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for voice-activated selective memory for voice-capturing devices are described. Using the techniques described herein, representations of voice input from voice-capturing devices may be deleted, and potentially the effects of the input may be undone, based on other voice input. Suitable voice-capturing devices may include smart speakers, personal electronic devices (e.g., smartphones, tablet computers), personal computers, as well as other home automation and/or "Internet of Things" devices. The devices may be configurable to access one or more services provided by a cloud-based service provider environment, such as one or more network-accessible voice-based services that analyze and respond to voice input streamed from the devices. One or more services in the service provider environment referred to as "skills" may be invoked based on analysis of voice input. Representations of voice input from users may be stored, e.g., as audio data and/or transcription data in the service provider environment and potentially in external systems. Via additional voice input, users may ask the service provider environment to disregard, forget, delete, or undo other voice input. Based on the additional voice input, the service provider environment may delete representations of any voice input indicated by the user. For example, if a user speaks a phrase such as "[wake word], forget that," the service provider environment may delete data associated with the most recent utterance. Additionally, in some embodiments, the service provider environment may attempt to undo or revert the effects of any skills or other services that were invoked based on the now-deleted voice input. For example, if the user supplied voice input to order food through a skill that interacts with an external system of a restaurant, then the service provider environment may attempt to undo that order by sending an undo command to the external system. Representations of voice input throughout the service provider environment may be tagged with identifying information, and the representations may be deleted by applying rules to tags. In one embodiment, representations of voice input may be deleted automatically while in a private session, e.g., as requested by a user via voice input. Using these techniques for voice-activated selective memory, users may be granted simplified control over the storage of their information in the cloud.

Figure 1B:
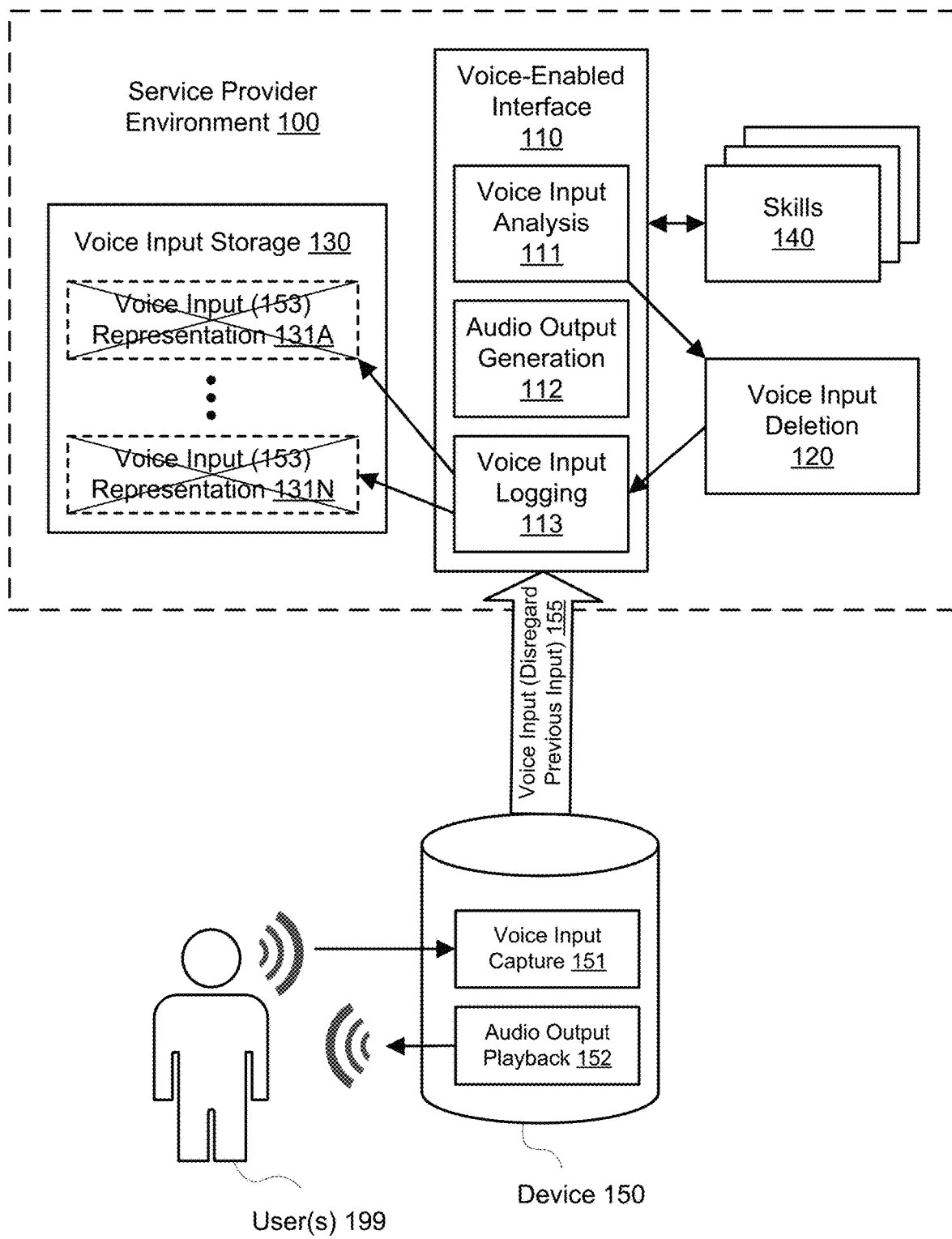

FIG. 1A and FIG. 1B illustrate an example system environment for voice-activated selective memory for voice-capturing devices, according to one embodiment. As shown in FIG. 1A, a set of voice-capturing devices such as device 150 may interact with one or more components of a service provider environment 100, e.g., to access additional functionality or computing resources not available locally on the devices but instead provided (at least in part) by the service provider environment. The service provider environment 100 may provide functionality or computing resources to various types of devices outside the service provider environment, such as various types of electronic devices, digital devices, and/or computing devices. For example, the device 150 may represent a smart speaker, a smart television or other audiovisual component, a home automation device, and/or another type of device in the "Internet of Things (IoT)." The devices may be referred to herein as voice-capturing devices or voice-capturing endpoints and may include a voice interaction capability. In one embodiment, the devices may include a voice input capture component, such as one or more microphones and/or other suitable voice-capturing or audio input component(s), usable to capture audio input including speech. In one embodiment, the devices may include an audio output component, such as one or more speakers and/or other suitable audio output component(s), usable to play back audio output including computer-generated speech. Representations of voice input, such as audio data, transcriptions of audio data, and other artifacts, may be stored in the service provider environment 100 and potentially in external components. Using the techniques described herein, the stored representations of voice input from the devices may be deleted based (at least in part) on other voice input from the devices.

The devices may be authorized to access one or more resources and/or services provided by the cloud-based service provider environment 100. The service provider environment 100 may include various components that are owned or managed by one or more entities or organizations called service providers. In various embodiments, aspects of the service provider environment 100 may be provided as one or more publicly accessible services that are "in the cloud" relative to the devices or instead as one or more privately accessible services. The components of the service provider environment 100 may be located in one or more data centers and in one or more geographical locations. The service provider environment 100 may include and/or offer a plurality of services, and the services may perform various functions or operations. In various embodiments, some of the services may be accessed by the devices while others of the services may be accessed only by other services and not directly by the device. The services may be implemented according to a service-oriented architecture (SOA) in which services exchange requests and responses to perform complex operations. In various embodiments, the services may include a network-accessible, voice-enabled interface 110; a voice input deletion functionality 120; a voice input storage functionality 130; voice-enabled skills 140; and/or various other services.

The devices, including device 150, may stream or otherwise send voice input to the voice-enabled interface 110. The voice-enabled interface 110 may be part of a voice interaction platform hosted in a cloud computing environment. Using a voice input analysis component 111, the voice-enabled interface 110 may analyze the voice input from one of the devices and take one or more actions responsive to the voice input, such as initiating one or more tasks on behalf of the originating device. Using an audio output generation component 112, the voice-enabled interface 110 may generate and send audio output (e.g., synthetic or computer-generated speech output, pre-recorded audio, voicemail, music, and so on) back to the originating device for playback on the device. The actions and/or audio output may vary based on the resources and/or services of the service provider environment 100, also referred to herein as skills 140, that are accessible to the particular device. In various embodiments, the skills 140 provided by the service provider environment 100 may include, for example: scheduling conference calls; identifying a speaker during a conference call; acting as a scheduling assistant; providing calendaring services; recording a meeting; accessing calendars, phone directories, and/or e-mail; creating, scheduling, and/or modifying tasks; ordering items or food; requesting assistance, such as room service or a taxi; sending text messages; performing queries of search engines; playing music or other audio streams; and so on. In one embodiment, the particular skills accessible to a device may vary and may be modified by an administrator or other user with suitable configuration privileges. In some embodiments, the device 150 may be linked to one or more other voice-capturing devices, e.g., by configuration data stored in the service provider environment 100. For example, multiple voice-capturing devices in the same residence, in the same conference room, or in different locations within the same hotel room may be linked such that voice input to one of the devices can affect the use of other ones of the devices. Multiple voice-capturing devices may be linked to the same account or user.

Using a voice input capture component 151 such as one or more microphones, a particular voice-capturing device 150 may be configured to capture voice input 153 and send the voice input to the service provider environment 100 via the network(s) 190. In one embodiment, the voice input 153 may represent speech input from one or more users 199. The speech may include natural language speech. The voice input 153 may represent digital audio in any suitable format. The voice input 153 may be streamed or otherwise sent from the device 150 to the interface 110. Using the voice input analysis 111, the service provider environment 100 may decode the voice input 153 to determine one or more terms, phrases, or other utterances that are present in the audio. In one embodiment, one or more of the terms may represent commands to invoke functions (e.g., skills 140) provided by the service provider environment 100. In one embodiment, one or more of the terms may represent data usable by functions (e.g., skills 140) provided by the service provider environment 100. In one embodiment, the same voice input may include both an invocation of a skill (or other function) and also arguments or other data usable by that skill or function.

In one embodiment, the voice input capture 151 at a voice-capturing device 150 may be prompted by detection of an audible "wake word" associated with the device, e.g., using the voice input capture to monitor audio in the vicinity of the device while the device is powered on and appropriately configured. In one embodiment, the voice input capture 151 may be prompted by a button press, a gesture, or another suitable user interaction instead of a wake word. In one embodiment, after the wake word or other user-supplied prompt is detected, the voice input capture 151 may continue to record (and the device may continue to stream) audio input until a pause of suitable duration is detected; until the voice-enabled interface 110 instructs the device to stop; until a particular duration has been reached for the captured audio; or until a button press, gesture, or other suitable user interaction is received to end the voice capture.

In one embodiment, the device 150 may include or have access to an audio output playback functionality 152, including a speaker and/or other suitable audio-generating component(s), usable to play back audio output including computer-generated speech. In various embodiments, the audio output playback 152 may be located on board the device 150 or instead located in another device, such as a remote control. The voice-enabled interface 110 may also include a component (or multiple components) for audio output generation 112. Using the audio output generation 112, the service provider environment 100 may generate audio output 154 representing computer-generated speech. The service provider environment 100 may stream or otherwise send the audio output 154 to the device 150, and the device may play back the output for user(s) 199 using the audio output playback 152. In various embodiments, the audio output 154 may represent an acknowledgement of some aspect of the voice input (e.g., acknowledgement that the requested task was performed successfully), a response to a question or inquiry posed by the user(s) 199, a request for more information from the user, or any other suitable audio-based interaction. In some embodiments, the device 150 may be configured to generate other forms of output, such as graphical output on a display, haptic feedback, Bluetooth signals to proximate devices, and so on.

The voice-enabled interface 110 may use a voice input logging functionality 113 to store a log of interactions between the devices and the service provider environment 100. For example, each utterance sent by a particular device 150 and analyzed by the voice input analysis 111 may be recorded in a log associated with the device, along with a timestamp. The log may be implemented using voice input storage 130 accessible to the logging functionality 113. The voice input storage may include persistent storage resources, potentially implemented one or more storage services of a multi-tenant provider network. The stored data in the log may include one or more types of representations of voice input 153, such as audio data, alphanumeric transcription data, and other artifacts. As shown in the example of FIG. 1A, representations 131A through 131N may be stored for the voice input 153. For example, the representation 131A may include audio data, and the representation 131N may include a transcription of that audio data (e.g., as generated using the voice input analysis 111). The audio data may represent all or part of the audio captured by the device 150 and sent to the service provider environment 100, while the transcription data may represent an artifact or output of applying speech-to-text analysis to the original audio data. In some embodiments, additional representations of audio input (e.g., audio or text) may be stored elsewhere in the service provider environment 100, e.g., in storage associated with various skills 140. For example, if a particular skill is invoked based on analysis of voice input, then a representation of that voice input (e.g., text generated using speech-to-text analysis) may be provided to that skill and stored by that skill. Similarly, additional representations of audio input (e.g., audio or text) may be stored elsewhere outside the service provider environment 100, e.g., in storage associated with various external systems such as search engine providers, partner databases, and so on. In one embodiment, representations 131A-131N of voice input may be encrypted within the service provider environment 100 on a user-specific basis, and the encryption keys may be held by corresponding users so that administrators of the service provider environment cannot access the contents of audio data and transcripts of their voice input. As will be discussed in greater detail below, a voice input deletion functionality 120 (e.g., a skill or other service) may initiate selective deletion of any of the representations 131A-131N based (at least in part) on additional voice input from the user 199 and/or device 150.

In one embodiment, the service provider environment 100 may include a device management service or functionality that is usable to determine or modify aspects of device configurations associated with the devices. For example, the device management may maintain a device-specific configuration corresponding to the device 150. In one embodiment, the device management may be provided by a service targeted to device management for businesses, educational institutions, and/or residences. In one embodiment, the device management service may be used to make particular skills accessible to a device, e.g., based on user input or input through an application programming interface (API). For example, user input to the device management service may identify a set of skills that a particular device or class of devices can access, e.g., as selected from a predetermined list of skills provided by the service provider environment 100. The device configuration for a device may include or be associated with a device identifier, such as a serial number of the device. A device configuration may also include additional parameters and their corresponding values. A device configuration may indicate a set of one or more skills 140 that are accessible to the device in the service provider environment 100. In various embodiments, all or part of a device configuration may be stored remotely in the service provider environment 100 and/or in storage locally accessible to the device itself. For example, a full configuration profile may be stored by the device management service, while a more limited set of configuration parameters may be stored in memory at the device.

The devices, including device 150, may communicate with the interface 110 (or other components of the service provider environment 100) over one or more networks 190, e.g., by conveying network-based service requests to the service provider environment via the network(s). In one embodiment, the network(s) 190 may include one or more wireless networks, such as one or more Wi-Fi networks or other types of wireless local area networks (WLANs). The wireless network(s) may be implemented using any suitable wireless communication technologies and any suitable configuration of networking components, such as one or more wireless routers. In one embodiment, the device 150 may include a wireless networking interface for accessing Wi-Fi and/or other suitable wireless networks. In one embodiment, the network(s) 190 may include communicate via one or more wired networks, such as one or more wired networks over a transmission medium such as Ethernet. In one embodiment, the device 150 may include a wired networking interface for accessing suitable wired networks. In various embodiments, the network(s) 190 may encompass any suitable combination of networking hardware and protocols necessary to establish network-based communications between the device 150 and service provider environment 100. For example, the network(s) 190 may generally encompass the various telecommunications networks and service providers that collectively implement the Internet. The network(s) 190 may also include private networks such as local area networks (LANs) or wide area networks (WANs) as well as public or private wireless networks. In one embodiment, the network(s) 190 may include the hardware (e.g., modems, routers, switches, load balancers, proxy servers, etc.) and software (e.g., protocol stacks, accounting software, firewall/security software, etc.) necessary to establish a networking link between two particular components. In one embodiments, the device 150 may be able to communicate with the service provider environment 100 using a private network rather than the public Internet. In one embodiment, the device 150 may represent a satellite device that connects to a central device over a local area network (wired or wireless) or direct connection (wired or wireless, e.g., Bluetooth), e.g., to stream voice input to the central device, and the central device may then stream the voice input to the service provider environment 100.

In one embodiment, the functionality of the various components of the service provider environment 100 may be distributed across different physical sites. For example, a first portion of the functionality of the service provider environment 100 may be implemented in one or more components that are located in the same local area network or physical site as the device 150, while a second portion of the functionality of the service provider environment 100 may be implemented "in the cloud" and accessible to the first portion via a wide area network. The first portion may include enough computing resources to perform tasks such as voice input analysis 111 as well as more frequently accessed services. All or part of the device configuration may be stored locally (in the first portion), in the cloud (the second portion), or in both portions. Using this distribution of services to localize more of the processing, network usage may be minimized between a local site (including the device) and the cloud-based portion of the service provider environment 100. Such a distribution of service(s) may be especially beneficial if a device 150 is located in a remote area having restricted network access.

Figure 7:
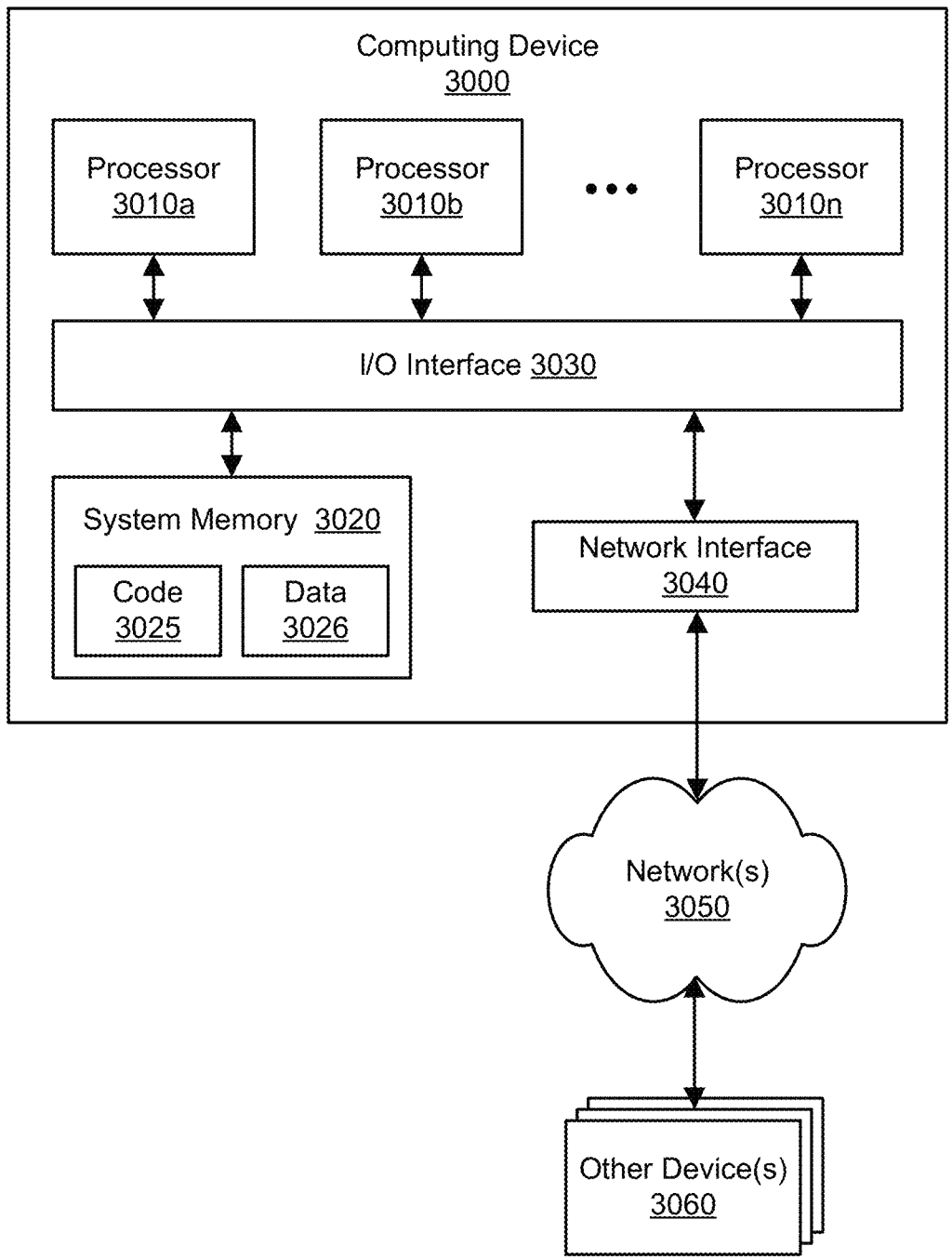
FIG. 7 illustrates an example computing device that may be used in some embodiments.

Any of the voice-capturing devices, such as device 150, may be implemented by the example computing device 3000 illustrated in FIG. 7. The service provider environment 100 may include a plurality of computing devices, any of which may be implemented by the example computing device 3000 illustrated in FIG. 7. In various embodiments, portions of the described functionality of the service provider environment 100 may be provided by the same computing device or by any suitable number of different computing devices. If any of the components of the service provider environment 100 are implemented using different computing devices, then the components and their respective computing devices may be communicatively coupled, e.g., via one or more networks. Each of the illustrated components may represent any combination of software and hardware usable to perform their respective functions. It is contemplated that the device 150, service provider environment 100, and networking infrastructure 190 may include additional components not shown, fewer components than shown, or different combinations, configurations, or quantities of the components shown.

FIG. 1B may represent a continuation of the example shown in FIG. 1A. The voice input deletion functionality 120 (e.g., a skill or other service) may initiate selective deletion of any of the representations 131A-131N based (at least in part) on additional voice input 155 from the user 199 and/or device 150. Following the voice input supplied and stored (as one or more representations) in FIG. 1A, a user 199 of the device 150 may provide additional voice input 155 as shown in FIG. 1B. The additional voice input 155 may represent a command to disregard previous voice input, as determined using the voice input analysis 111. The previous voice input to be disregarded may include one utterance (e.g., the most recent utterance or another utterance received at some point in the past), a set of multiple utterances (e.g., utterances received over the last hour, day, week, and so on), or all utterances associated with the device and/or user, as indicated by the additional voice input. The user's intention to disregard may be determined based on additional voice input seeking to disregard, forget, revert, or undo one or more other utterances. In one embodiment, suitable input may include voice input such as "[wake word], forget that," "[wake word], forget the last hour," "[wake word], forget everything I've said," and so on. The voice input analysis 111 may detect suitable keywords (following the wake word or other user prompt) to determine that one or more utterances should be disregarded, e.g., keywords reflecting an intention to disregard, forget, revert, or undo. The voice input analysis 111 may also detect suitable keywords (following the wake word or other user prompt) to determine which utterances should be disregarded, e.g., based on a specified period of time or a specific identification of the utterance(s) to be disregarded.

In one embodiment, the additional voice input 155 may be received from a different voice-capturing device that is associated with the device 150, e.g., by configuration data in the service provider environment 100. For example, multiple voice-capturing devices in the same residence or in different locations within the same hotel room may be linked. For a set of linked devices, voice input to one of the devices can result in the service provider environment 100 disregarding voice input from another one of the devices. In some embodiments, temporal proximity may be used to determine whether voice input to one device can delete or undo voice input from another device. For example, a cross-device deletion or undo may be permitted only if the additional voice input to disregard the earlier voice input is received within some threshold period of time after the earlier voice input. In some embodiments, spatial proximity may be used to determine whether voice input to one device can delete or undo voice input from another device. For example, a cross-device deletion or undo may be permitted only if the additional voice input to disregard the earlier voice input is received from a device within some threshold distance from the device that provided the earlier voice input.

In response to determining that the additional voice input 155 represents a command to disregard other voice input, the voice-enabled services 110 may invoke the voice input deletion functionality 120, e.g., by sending an appropriate request along with one or more identifiers or characteristics of the utterance(s) to be deleted. In one embodiment, if the service provider environment 100 determines that some aspect of the additional voice input 155 is ambiguous, then audio output may be generated and sent to the device 150 to seek disambiguation input from the user 199. For example, if the voice input deletion functionality 120 cannot determine which utterances should be deleted, then the deletion functionality may interact with the audio output generation to ask the user for clarification. In the example of FIG. 1B, the additional voice input 155 indicates that the previous voice input 153 should be disregarded. For example, if the additional voice input states "[wake word], forget that," and the voice input 153 was the utterance immediately prior to the additional voice input 155, then the earlier voice input 153 may be identified as the target of the deletion request from the user 199. As another example, if the additional voice input states "[wake word], forget the last hour," and the voice input 153 was received (and timestamped) within the previous hour, then the earlier voice input 153 may be identified as one target of the deletion request from the user 199. In such a scenario, other utterances may also be identified as targets of the deletion request, e.g., if they were received from the device 150 within the last hour. The voice input deletion functionality 120 may instruct the voice input logging 113 (or any other suitable component(s)) to delete any stored representations of the voice input, such as representations 131A and 131N. In various embodiments, deletion may include marking one or more files or other storage elements for deletion, altering a directory structure to make the file(s) or storage element(s) inaccessible, altering or removing an encryption key (e.g., associated with the user 199) to make the file(s) or storage element(s) inaccessible, and so on. In one embodiment, for additional security, one or more stored representations of the additional voice input 155 may also be deleted.

In one embodiment, one or more stored representations of the voice input 153 may be deleted from the device 150 itself, e.g., from storage locally accessible to the device. For example, the stored representations on the device 150 may include audio data, transcription data, artifacts of voice input analysis such as timers and configuration settings, and so on. In one embodiment, the stored representation(s) may be deleted from the device 150 in response to a deletion command sent from the service provider environment 100. In one embodiment, the stored representation(s) may be deleted from the device 150 based on analysis of the additional voice input 155 as performed on the device itself. In one embodiment, the decision to delete the stored representation(s) of earlier voice input may be made anywhere from the device 150 to the service provider environment 100 and any intermediate components between the device and the service provider environment. Similarly, in some embodiments, the effects of earlier voice input may be reverted on the device 150. For example, a timer or configuration setting that was set on the device 150 may be undone based on the additional voice input 155.

Figure 2A:
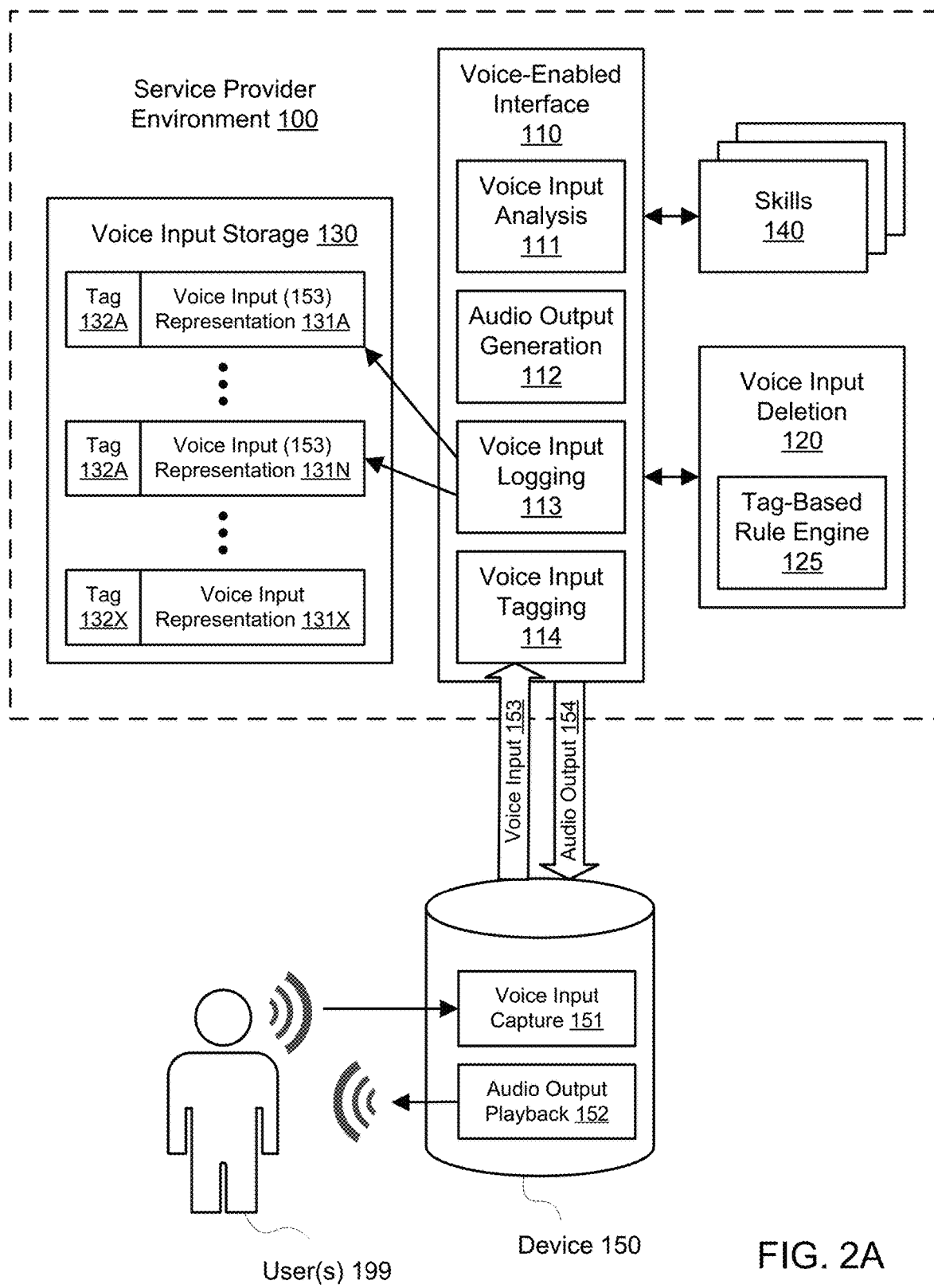
FIG. 2A and FIG. 2B illustrate further aspects of the example system environment for voice-activated selective memory for voice-capturing devices, including applying rules based on tags to delete representations of voice input, according to one embodiment.
Figure 2B:
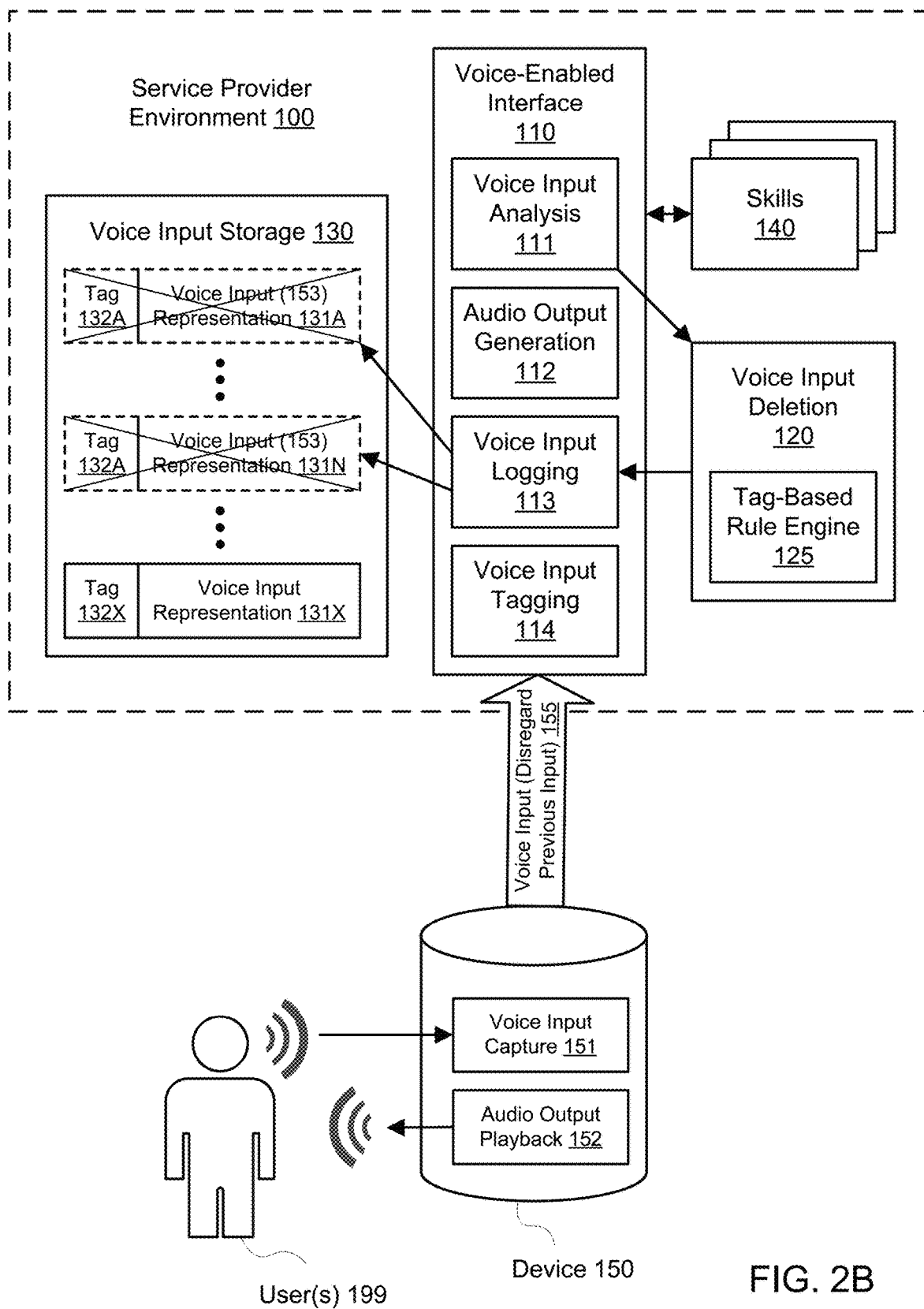

FIG. 2A and FIG. 2B illustrate further aspects of the example system environment for voice-activated selective memory for voice-capturing devices, including applying rules based on tags to delete representations of voice input, according to one embodiment. In one embodiment, utterances such as voice input 153 may be tagged with metadata. The voice input 153 may be tagged at the device 150 or, as shown in FIG. 2A, by a voice input tagging functionality 114 on receipt of the voice input by the voice-enabled interface 110. A representation of voice input may be associated with a particular tag. As shown in the example of FIG. 2A, stored representation 131A is associated with tag 132A, and stored representation 131N is also associated with the same tag 132A to indicate their shared origin in the same voice input 153. However, a stored representation 131X of a difference voice input may have a different tag 132X. A tag may include metadata that identifies characteristics of the voice input, characteristics of the device used to capture the voice input, characteristics of the user associated with the voice input, a session identifier, a timestamp, and/or other suitable elements. For example, the tag may include a label indicating the division of an organization to which the user or device belongs. As another example, the tag may include an identifier of a country or region. In one embodiment, the tag may represent a globally unique identifier (GUID) within the context of the service provider environment. In one embodiment, the tag may represent an indication as to whether the utterance is eligible for deletion or undo. In one embodiment, the tag 132A associated with voice input 153 may be generated once (e.g., when the input is captured at the device 150 or received by the service provider environment 100) and then propagated with other representations of the input, such as a transcript stored within the service provider environment or a representation passed to a skill that is invoked based on analysis 111 of the voice input. By propagating the tag in this manner, the path of a specific utterance may be traced in the service provider environment 100 and potentially in external systems as well, in order to facilitate deletion of records of the utterance.

In one embodiment, the deletion may be performed by applying one or more rules to representations based (at least in part) on the contents of their associated tags. In one embodiment, the voice input deletion functionality 120 may include a tag-based rule engine 125 to implement application of rules based on tags. For example, if tags indicate the device and timestamp associated with voice input, then a particular rule may delete representations of voice input associated with a particular device and received within a particular window of time. As another example, a particular rule may delete representations of voice input having tags that are associated with a particular corporate division. As yet another example, a particular rule may delete representations of voice input having tags that are associated with a particular user but not representations of voice input associated with other users. In one embodiment, deletion may be initiated by sending a delete command (along with data or metadata identifying the utterances to be deleted, e.g., using a tag) as an event on an event bus, and other services and skills within the service provider environment 100 may listen to the event bus for such commands. For example, the voice input deletion functionality 120 may generate an event that instructs recipients such as the voice input logging 113 to delete any stored representations that have the tag 132A. As a result of receiving this event, the voice input logging 113 may initiate deletion of the representations 131A and 131N but not representation 131X.

Figure 3:
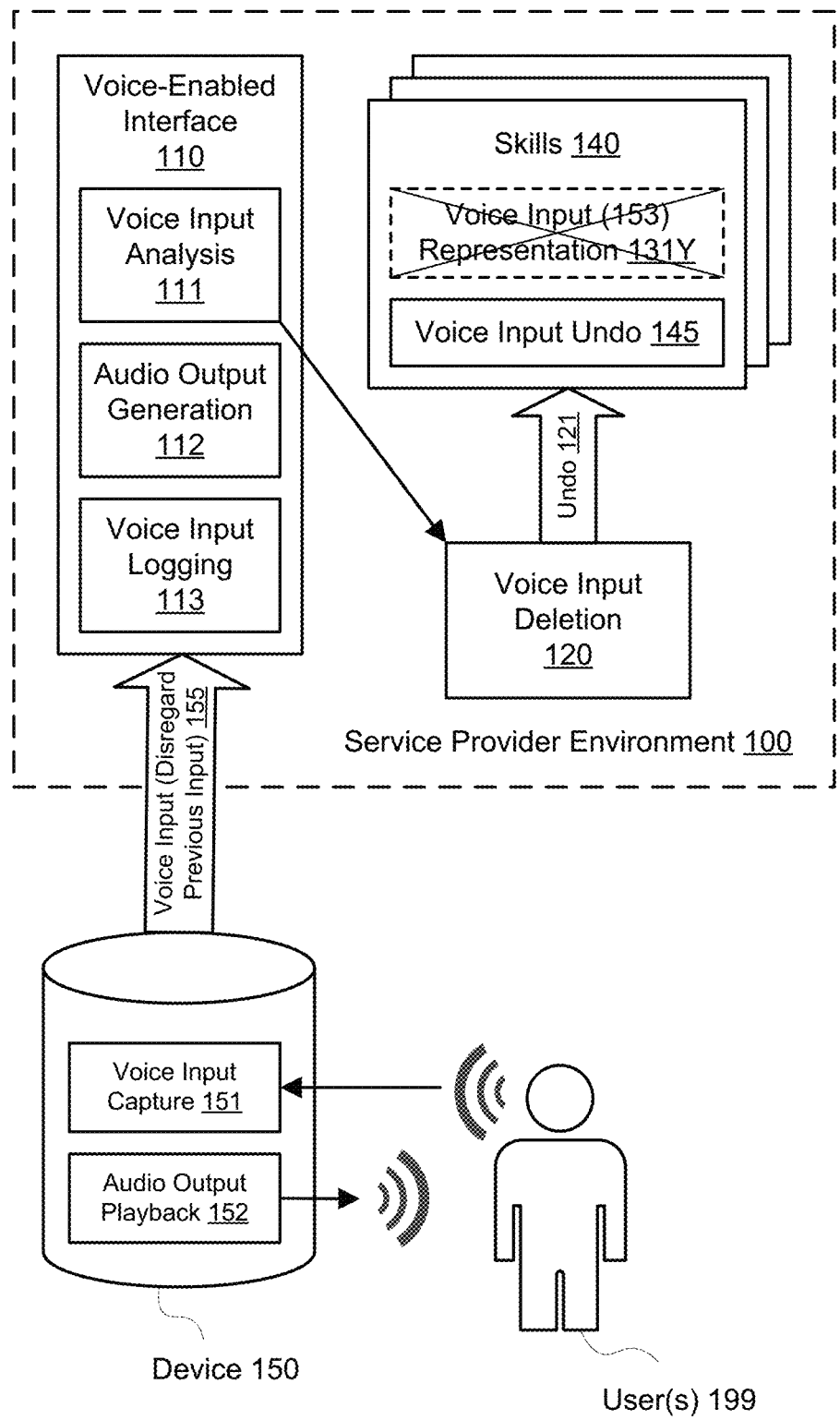
FIG. 3 illustrates further aspects of the example system environment for voice-activated selective memory for voice-capturing devices, including sending undo requests to skills in the service provider environment, according to one embodiment.

FIG. 3 illustrates further aspects of the example system environment for voice-activated selective memory for voice-capturing devices, including sending undo requests to skills in the service provider environment, according to one embodiment. In some embodiments, one or more of the skills 140 may have been invoked based on analysis 111 of the voice input 153. For example, if the voice input 153 represented a command to perform a query of a search engine, then the search terms in the voice input may have been passed to a search engine skill (in the skills 140) and then potentially from the search engine skill to a search engine external to the service provider environment 100. As another example, if the voice input 153 represented a command to place an order at a restaurant, then the search terms in the voice input may have been passed to a restaurant skill (in the skills 140) and then potentially from the restaurant skill to a restaurant order system external to the service provider environment 100.

If one or more of the skills 140 were invoked for earlier voice input that the user now seeks to disregard, then the voice input deletion functionality 120 may send an undo command 121 to the skill(s). The undo command 121 may represent a request to revert any effects taken in response to the earlier voice input 153. In some embodiments, the skill(s) 140 may include a voice input undo functionality 145 that may attempt, if possible, to undo any actions taken in response to earlier voice input. In response to receipt of the undo command 121, the skill(s) 140 may delete any stored representations of the relevant voice input 153, such as representation 131Y. Further actions taken by the voice input undo 145 may vary based on the nature of the actions taken in response to the earlier voice input; undo may not be guaranteed. In the example of the search query, undoing the query may not be possible, but the skill may be able to delete any data generated and stored in performing the query. In the example of the restaurant order, undoing the order may be possible if the undo command 121 is received in time. Additionally, the restaurant skill may be able to delete any data generated and stored in placing the order. In one embodiment, the tag 132A for the voice input 153 may have been passed to the skill(s) 140, and the skill(s) may delete any representations of the voice input based (at least in part) on identifying any representations with that particular tag.

Figure 4:
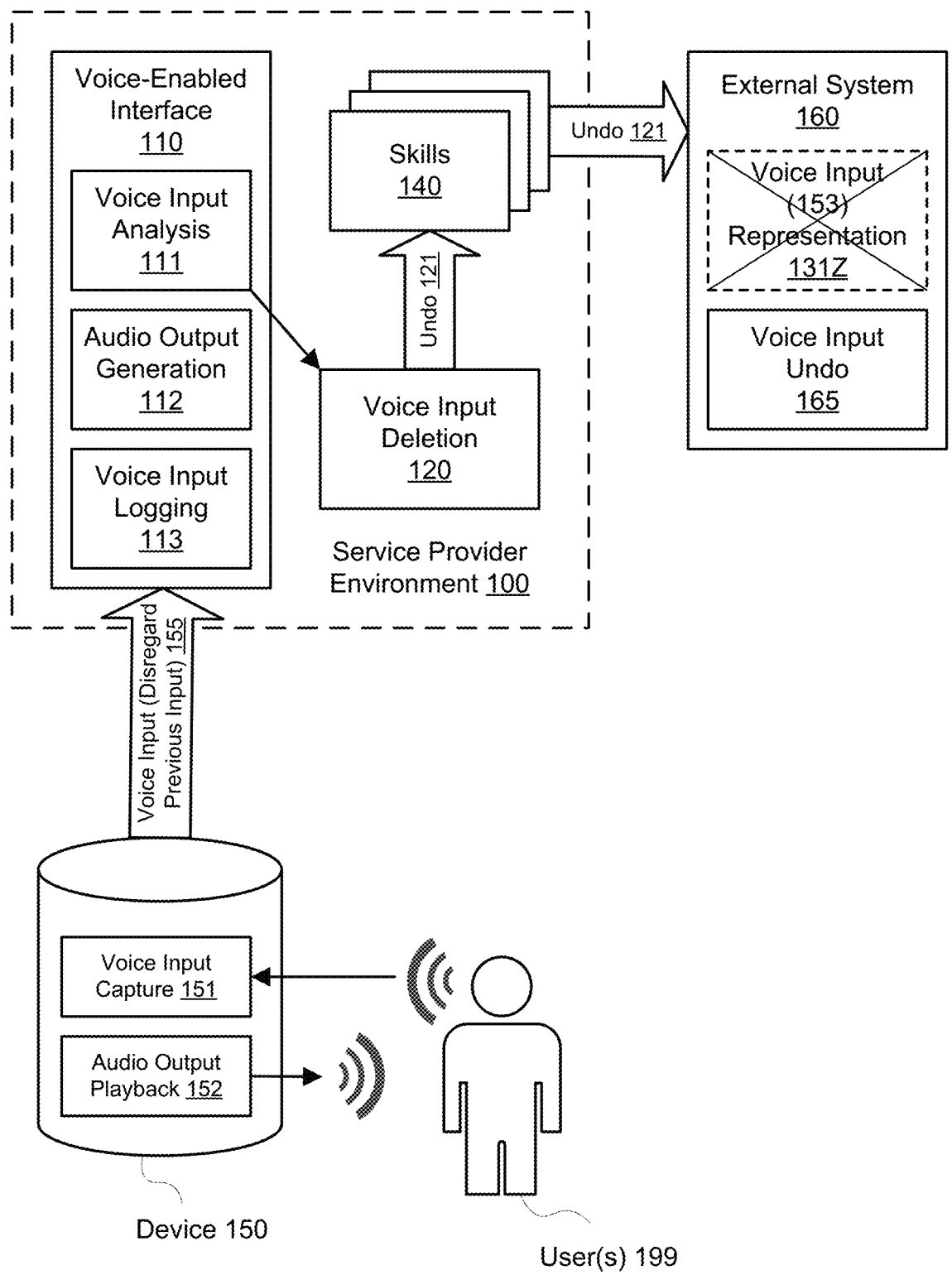
FIG. 4 illustrates further aspects of the example system environment for voice-activated selective memory for voice-capturing devices, including sending undo requests to components outside the service provider environment, according to one embodiment.

FIG. 4 illustrates further aspects of the example system environment for voice-activated selective memory for voice-capturing devices, including sending undo requests to components outside the service provider environment, according to one embodiment. In some embodiments, one or more systems or services outside the service provider environment 100 may have been invoked based on analysis 111 of the voice input 153. For example, if the voice input 153 represented a command to perform a query of a search engine, then the search terms in the voice input may have been passed to a search engine skill (in the skills 140) and then potentially from the search engine skill to a search engine system 160 external to the service provider environment 100. As another example, if the voice input 153 represented a command to place an order at a restaurant, then the search terms in the voice input may have been passed to a restaurant skill (in the skills 140) and then potentially from the restaurant skill to a restaurant order system 160 external to the service provider environment 100.

If an external system 160 was contacted in connection with actions taken for earlier voice input that the user now seeks to disregard, then the voice input deletion functionality 120 may send an undo command 121 to the system 160. In one embodiment, as shown in the example of FIG. 4, the undo command 121 may be sent by the voice input deletion functionality 120 to the skill(s) 140 and then from the skill(s) to the external system 160. As discussed above, the undo command 121 may represent a request to revert any effects taken in response to the earlier voice input 153. In some embodiments, the external system 165 may include a voice input undo functionality 165 that may attempt, if possible, to revert any actions taken in response to earlier voice input. In response to receipt of the undo command 121, the external system 160 may delete any stored representations of the relevant voice input 153, such as representation 131Z. Actions taken by the voice input undo 165 may vary based on the nature of the actions taken in response to the earlier voice input; undo may not be guaranteed. In the example of the search query, undoing the query may not be possible, but the external search engine may be able to delete any data generated and stored in performing the query. In the example of the restaurant order, undoing the order may be possible if the undo command 121 is received in time. Additionally, the external restaurant system may be able to delete any data generated and stored in placing the order. In one embodiment, the tag 132A for the voice input 153 may have been passed to the external system 160, and the external system may delete any representations of the voice input based (at least in part) on identifying any representations with that particular tag.

Figure 5:
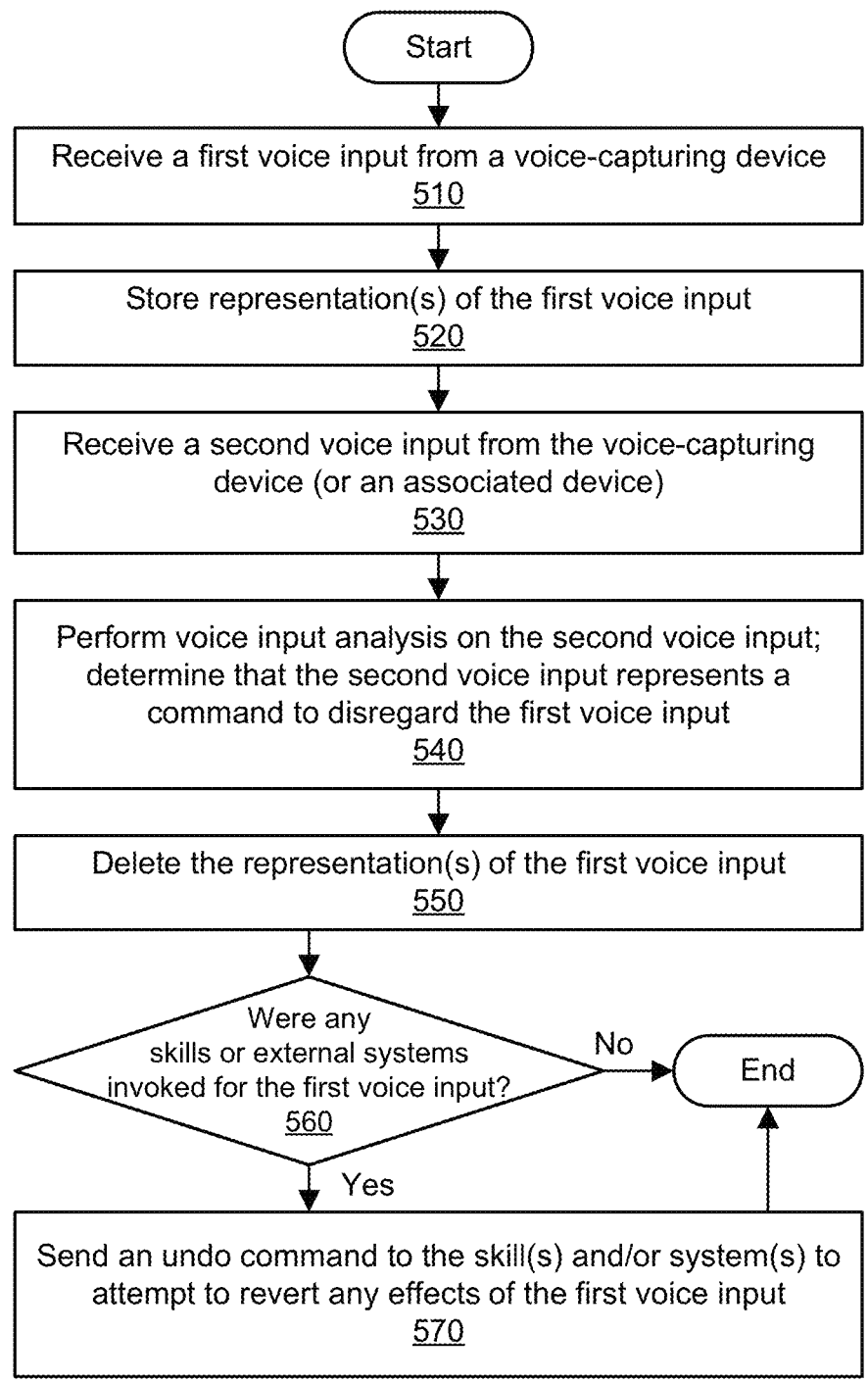
FIG. 5 is a flowchart illustrating a method for implementing voice-activated selective memory for voice-capturing devices, according to one embodiment.

FIG. 5 is a flowchart illustrating a method for implementing voice-activated selective memory for voice-capturing devices, according to one embodiment. As shown in 510, a first voice input may be received from a voice-capturing device. The first voice input may be received via a network and analyzed by one or more services of a network-accessible service provider environment, e.g., as implemented in the cloud. The first voice input may comprise one or more utterances from a user of the device. The user may not have ownership privileges with respect to the device within the service provider environment. For example, the user may be an employee using a voice-capturing device associated with and managed by the employer, or the user may be a hotel guest using a voice-capturing device associated with and managed by the hotel. Accordingly, the user may not have access to a companion application that permits deletion of specific utterances using a graphical user interface on a mobile device or personal computer.

As shown in 520, one or more representations of the first voice input may be stored, e.g., in storage associated with the service provider environment. The representation(s) may include audio data, transcription data (e.g., generated using speech-to-text analysis of the audio data), and/or other artifacts of the voice input. A representation may include all or part of an utterance. The representation(s) may be stored in a log of voice input associated with a device and/or user, in a voice input analysis service that uses machine learning techniques on voice input to improve future analysis, in one or more skills within the service provider environment that are invoked based on the voice input, in one or more external systems that interact with skills, and/or in other suitable locations. A representation of voice input may be associated with a tag, and the tag may include metadata that identifies characteristics of the voice input, the device used to capture the voice input, the user associated with the voice input, a session identifier, and so on. For example, the tag may include a label indicating the division of an organization to which the user or device belongs. As another example, the tag may include an identifier of a country or region. In one embodiment, the tag may represent a globally unique identifier (GUID) within the context of the service provider environment. In one embodiment, the tag may represent an indication as to whether the utterance is eligible for deletion or undo. In one embodiment, the tag associated with voice input may be generated once (e.g., when the input is captured at the device or received by the service provider environment) and then propagated with other representations of the input, such as a transcript stored within the service provider environment or a representation passed to a skill that is invoked based on analysis of the voice input. By propagating the tag in this manner, the path of a specific utterance may be traced in the service provider environment and potentially in external systems as well, in order to facilitate deletion of records of the utterance.

As shown in 530, a second voice input may be received from the voice-capturing device or from an associated device. The second voice input may also be received via the network and analyzed by one or more services of the service provider environment. The second voice input may comprise one or more utterances from a user of the device. In various embodiments, this user may be the same user or a different user than the one who supplied the first voice input. In one embodiment, the users responsible for various utterances may be distinguished based on voice profiles. A voice profile may represent a specific, named user (e.g., who has registered to "claim" a voice profile generated by the service provider environment) or a specific, unnamed user. In one embodiment, the users responsible for various utterances may be distinguished based on other techniques, such as passcodes or the detection of users' mobile devices within the vicinity of the voice-capturing device.

As shown in 540, voice input analysis may be performed on the second voice input. The analysis may determine that the second voice input represents a command to disregard the first voice input. For example, the analysis may apply speech-to-text techniques to detect a phrase (following a wake word or other user prompt for voice capture) such as "forget that," "forget the last hour," "delete that last thing," "undo that order," and so on. In one embodiment, the service provider environment may identify the user who provided the second voice input and may determine whether that user has the privileges to delete or undo the first voice input. In one embodiment, for example, the service provider environment may take action to delete or undo the first voice input only if the user who supplied the second voice input is the same user who supplied the first voice input. In one embodiment, the service provider environment may take action to delete or undo the first voice input only if the device that supplied the second voice input is the same device that supplied the first voice input. If the user has sufficient privileges to request a delete or undo, then the service provider environment may invoke a deletion functionality (e.g., a skill or service) within the service provider environment. The service provider environment may pass any required data, such as a tag or other identifying characteristics of the utterance(s) to be deleted, to the deletion functionality.

In one embodiment, the second voice input may represent a command to disregard (e.g., delete and/or undo the effects of) a single utterance, e.g., the most recent utterance from the device. In one embodiment, the second voice input may represent a command to disregard multiple utterances, e.g., over the past hour, day, week, and so on. Using the second voice input, the user may identify any one or more utterances based (at least in part) on specific characteristics of the utterance(s), the time or window of time associated with the utterance(s), and so on.

As shown in 550, one or more representations of the first voice input may be deleted. In various embodiments, deletion may include marking one or more files or other storage elements for deletion, altering a directory structure to make the file(s) or storage element(s) inaccessible, altering or removing a secure key (e.g., associated with the user) to make the file(s) or storage element(s) inaccessible, and so on. In one embodiment, the deletion may be performed by applying one or more rules to representations based (at least in part) on the contents of their associated tags. For example, if tags indicate the device and timestamp associated with voice input, then a particular rule may delete representations of voice input associated with a particular device and received within a particular window of time. In one embodiment, deletion may be initiated by sending a delete command (along with data or metadata identifying the utterances to be deleted, e.g., using a tag) as an event on an event bus, and other services and skills within the service provider environment may listen to the event bus for such commands. In one embodiment, for additional security, one or more representations of the second voice input may also be deleted.

As shown in 560, it may be determined whether one or more skills or external systems were invoked for the first voice input. For example, if the first voice input represented a command to perform a query of a search engine, then the search terms in the first voice input may have been passed to a search engine skill and then from the search engine skill to a search engine external to the service provider environment. As another example, if the first voice input represented a command to place an order at a restaurant, then the search terms in the first voice input may have been passed to a restaurant skill and then from the restaurant skill to a restaurant order system external to the service provider environment.

If one or more skills or external systems were invoked, then as shown in 570, the deletion functionality may send an undo command to the skill(s) and/or external system(s). The undo command may represent a request to revert any effects taken in response to the first voice input. In the example of the search query, undoing the query may not be possible, but the skill and/or external search engine may be able to delete any data generated and stored in performing the query. In the example of the restaurant order, undoing the order may be possible if the undo command is received in time. Additionally, the restaurant skill and/or external restaurant system may be able to delete any data generated and stored in placing the order. In one embodiment, the tag for the first voice input may have been passed to the skill and/or external system, and the skill and/or external system may delete any representations of the first voice input based (at least in part) on identifying and applying one or more rules to any representations with that particular tag.

Figure 6:
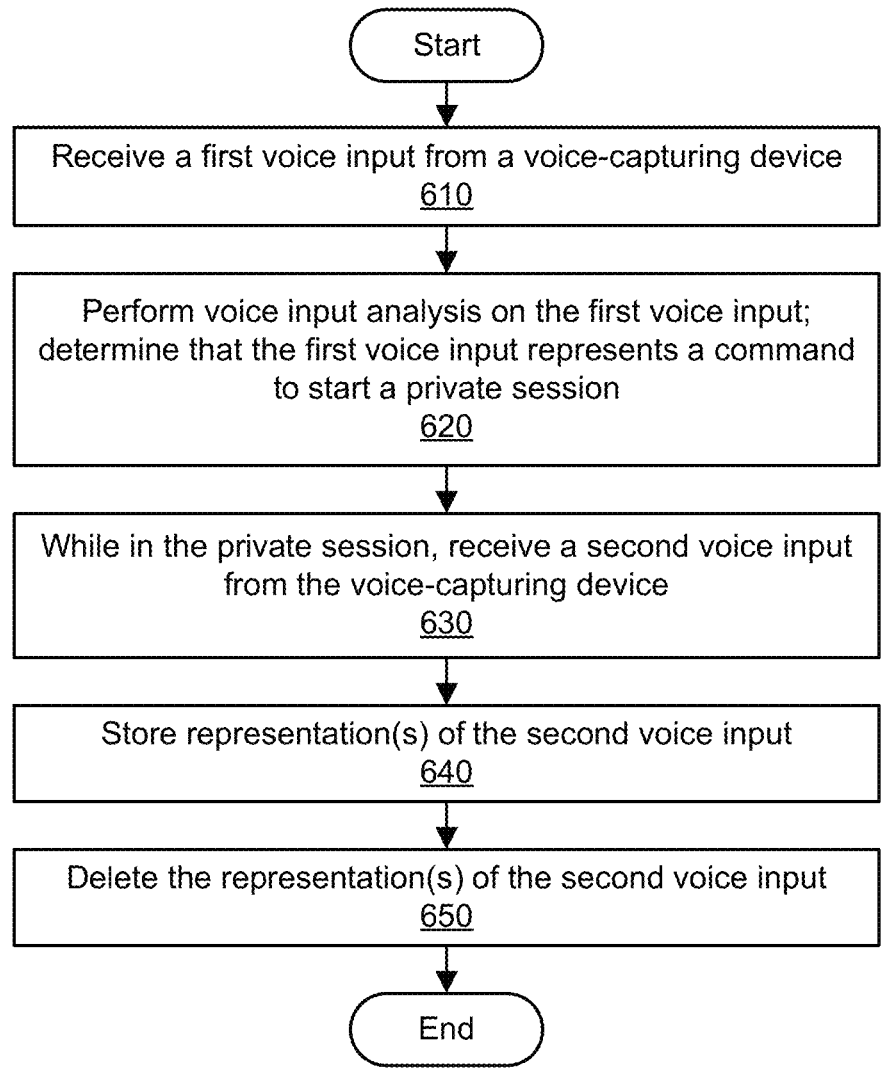
FIG. 6 is a flowchart illustrating further aspects of the method for implementing voice-activated selective memory for voice-capturing devices, including deleting representations of voice input in a private mode, according to one embodiment.

FIG. 6 is a flowchart illustrating further aspects of the method for implementing voice-activated selective memory for voice-capturing devices, including deleting representations of voice input in a private mode, according to one embodiment. As shown in 610, a first voice input may be received from a voice-capturing device. The first voice input may be received via a network and analyzed by one or more services of the service provider environment. The first voice input may comprise one or more utterances from a user of the device. As shown in 620, voice input analysis may be performed on the first voice input. The analysis may determine that the first voice input represents a command to enter a private mode, a secure mode, an executive session, or otherwise a session in which enhanced security is desired. For example, the analysis may apply speech-to-text techniques to detect a phrase (following a wake word or other user prompt for voice capture) such as "forget everything for the next hour," "go into executive session," "go off the record," and so on. Based (at least in part) on analysis of the first voice input, the starting time and/or duration of the private session may be determined. The private session may last for a period of time identified by the user or indefinitely, e.g., until the user supplies additional input to end the private session. Based on the analysis of the first voice input, the service provider environment may start a private session for the device and/or user. In one embodiment, the service provider environment may start a private session based not on voice input but on an identity of the user of the device, on security-related keywords detected in a teleconference invitation, and so on.

The user may not have ownership privileges with respect to the device within the service provider environment. For example, the user may be an employee using a voice-capturing device associated with and managed by the employer, or the user may be a hotel guest using a voice-capturing device associated with and managed by the hotel. In some embodiments, the ability to start a private session may be enabled or disabled for particular users and/or devices by an administrator with sufficient privileges within the service provider environment. In one embodiment, the service provider environment may identify the user who provided the first voice input and may determine whether that user has the privileges to enter the private session.

As shown in 630, while in the private session, a second voice input may be received from the voice-capturing device. The second voice input may be received via a network and analyzed by one or more services of the service provider environment. The second voice input may comprise one or more utterances from a user of the device. Based on the analysis of the second voice input, the service provider environment may invoke one or more skills, and the skills may potentially interact with one or more external systems to accomplish any requested task(s).

As shown in 640, one or more representations of the second voice input may be stored, e.g., in storage associated with the service provider environment. The representation(s) may include audio data, transcription data (e.g., generated using speech-to-text analysis of the audio data), and/or other artifacts of the voice input. A representation may include all or part of an utterance. The representation(s) may be stored in a log of voice input associated with a device and/or user, in a voice input analysis service that uses machine learning techniques on voice input to improve future analysis, in one or more skills within the service provider environment that are invoked based on the voice input, in one or more external systems that interact with skills, and/or in other suitable locations. A representation of the second voice input may be associated with a tag, and the tag may include metadata that identifies characteristics of the second voice input, the device used to capture the second voice input, the user associated with the second voice input, and so on. In one embodiment, the tag may represent a globally unique identifier (GUID) within the context of the service provider environment. In one embodiment, the representation of the second voice input may be tagged for deletion based on its receipt while in the private session In one embodiment, the tag associated with second voice input may be generated once (e.g., when the input is captured at the device or received by the service provider environment) and then propagated with other representations of the input, such as a transcript stored within the service provider environment or a representation passed to a skill that is invoked based on analysis of the voice input. By propagating the tag in this manner, the path of a specific utterance may be traced in the service provider environment and potentially in external systems as well, in order to facilitate deletion of records of the utterance.

As shown in 650, one or more representations of the second voice input may be deleted. The service provider environment may automatically invoke a deletion functionality (e.g., a skill or service) within the service provider environment to forget any data generated and stored while in the private session. The deletion functionality may be invoked on an utterance-by-utterance basis or for all utterances made during the private session. The deletion functionality may be invoked after each utterance or at the end of the private session. The service provider environment may pass any required data, such as a tag or other identifying characteristics of the utterance(s) to be deleted, to the deletion functionality. The deletion functionality may attempt to delete any representations of the second voice input within the service provider environment (e.g., within a voice input log), in any invoked skill(s) (e.g., by sending a delete command), and/or in any external system(s) with which the invoked skill(s) interacted (e.g., by sending a delete command). In various embodiments, deletion may include marking one or more files or other storage elements for deletion, altering a directory structure to make the file(s) or storage element(s) inaccessible, altering or removing a secure key (e.g., associated with the user) to make the file(s) or storage element(s) inaccessible, and so on. In one embodiment, the deletion may be performed by applying one or more rules to representations based (at least in part) on the contents of their associated tags. For example, if tags indicate the device and timestamp associated with voice input, then a particular rule may delete representations of voice input associated with a particular device and received within a particular window of time. As another example, if tags indicate that utterances should be deleted, then a particular rule may delete representations of voice input associated with such tags. In one embodiment, for additional security, one or more representations of the first voice input may also be deleted.

Illustrative Computer System

In at least some embodiments, a computer system that implements a portion or all of one or more of the technologies described herein may include a computer system that includes or is configured to access one or more computer-readable media. FIG. 7 illustrates such a computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010 or a multiprocessor system including several processors 3010 (e.g., two, four, eight, or another suitable number). Processors 3010 may include any suitable processors capable of executing instructions. For example, in various embodiments, processors 3010 may be processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 7 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the Figures and described herein represent examples of embodiments of methods. The methods may be implemented in software, hardware, or a combination thereof. In various ones of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
one or more computing devices implementing one or more services in a service provider environment, wherein the one or more services are communicatively coupled to one or more voice-capturing devices via a network; and
wherein the one or more services are executable by the one or more computing devices to:
start a private session based at least in part on input from one of the one or more voice-capturing devices, wherein the private session comprises a session configured to automatically delete representations of received inputs based on an end of the private session;
receive a voice input from at least one of the one or more voice-capturing devices via the network, wherein the voice input is received while in the private session, and wherein the voice input comprises one or more utterances from a user of the one or more voice-capturing devices;
store and analyze a representation of the voice input in the service provider environment; and
after storing and analyzing the representation of the voice input and based on the end of the private session, automatically delete, without being directly prompted by user input, the stored representation of the voice input, wherein the stored representation is deleted based at least in part on the voice input having been received while in the private session.

2. The system as recited in claim 1, wherein the input from the one of the one or more voice-capturing devices is an initial voice input from the one or more voice-capturing devices.

3. The system as recited in claim 2, wherein a duration of the private session is determined based at least in part on the initial voice input.

4. The system as recited in claim 1, wherein a duration of the private session is determined based at least in part on an additional voice input from the one or more voice-capturing devices, wherein the additional voice input is received after the initiation of the private session.

5. The system as recited in claim 1, wherein the representation of the voice input is deleted after the end of the private session.

6. The system as recited in claim 1, wherein the representation of the voice input is deleted before the end of the private session.

7. A computer-implemented method, comprising:
starting a private session based at least in part on input from one of one or more voice-capturing devices, wherein the private session comprises a session configured to automatically delete representations of received inputs based on an end of the private session;
receiving, at a service provider environment comprising one or more services, a voice input from at least one of the one or more voice-capturing devices via a network, wherein the voice input is received while in the private session, and wherein the voice input comprises one or more utterances from a user of the one or more voice-capturing devices;
storing and analyzing a representation of the voice input in the service provider environment; and
after storing and analyzing the representation of the voice input and based on the end of the private session, automatically deleting, without being directly prompted by user input, the stored representation of the voice input based at least in part on the voice input having been received while in the private session.

8. The method as recited in claim 7, wherein the input from the one of the one or more voice-capturing devices is an initial voice input from the one or more voice-capturing devices.

9. The method as recited in claim 8, wherein a duration of the private session is determined based at least in part on the initial voice input.

10. The method as recited in claim 7, wherein a duration of the private session is determined based at least in part on an additional voice input from the one or more voice-capturing devices, wherein the additional voice input is received after the initiation of the private session.

11. The method as recited in claim 7, wherein the representation of the voice input is deleted after the end of the private session.

12. The method as recited in claim 7, wherein the representation of the voice input is deleted before the end of the private session.

13. The method as recited in claim 7, wherein the representation of the voice input comprises audio data or a transcription.

14. One or more non-transitory computer-readable storage media storing program instructions that, when executed on or across one or more processors, perform:
starting a private session based at least in part on input from one of one or more voice-capturing devices, wherein the private session comprises a session configured to automatically delete representations of received inputs based on an end of the private session;
receiving, at a service provider environment comprising one or more services, a voice input from at least one of the one or more voice-capturing devices via a network, wherein the voice input is received while in the private session, and wherein the voice input comprises one or more utterances from a user of the one or more voice-capturing devices;
storing and analyzing a representation of the voice input in the service provider environment; and
after storing and analyzing the representation of the voice input and based on the end of the private session, automatically deleting, without being directly prompted by user input, the stored representation of the voice input based at least in part on the voice input having been received while in private session.

15. The one or more non-transitory computer-readable storage media as recited in claim 14, wherein the input from the one of the one or more voice-capturing devices is an initial voice input from the one or more voice-capturing devices.

16. The one or more non-transitory computer-readable storage media as recited in claim 15, wherein a duration of the private session is determined based at least in part on the initial voice input.

17. The one or more non-transitory computer-readable storage media as recited in claim 14, wherein a duration of the private session is determined based at least in part on an additional voice input from the one or more voice-capturing devices, wherein the additional voice input is received after the initiation of the private session.

18. The one or more non-transitory computer-readable storage media as recited in claim 14, wherein the representation of the voice input is deleted after an end of the private session.

19. The one or more non-transitory computer-readable storage media as recited in claim 14, wherein the representation of the voice input is deleted before an end of the private session.

20. The one or more non-transitory computer-readable storage media as recited in claim 14, wherein the representation of the voice input comprises audio data or a transcription.

* * * * *